Aug. 6, 1929.  L. T. KNOWLES  1,723,356
WORK HOLDER
Filed Feb. 29, 1928
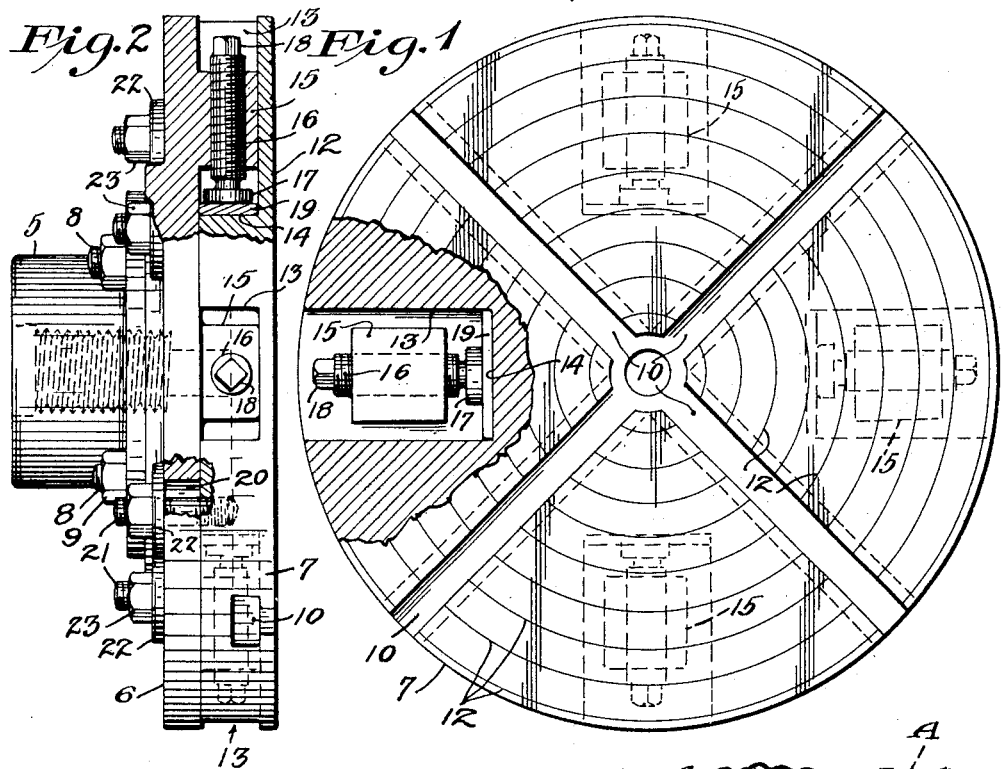
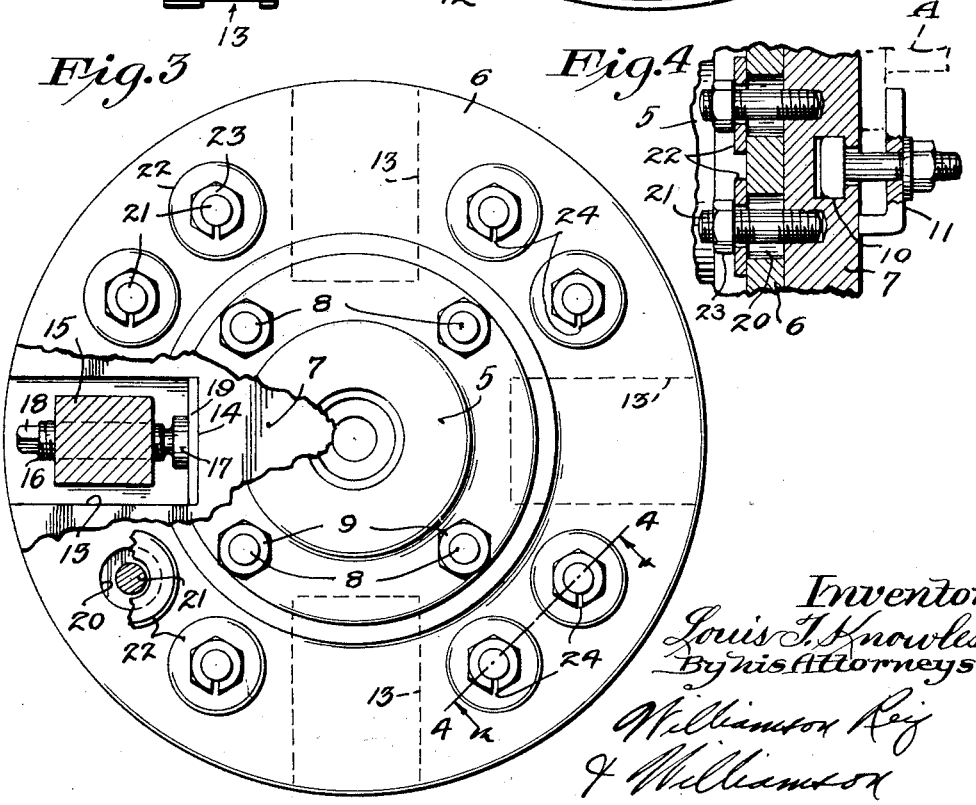
Inventor
Louis T. Knowles
By his Attorneys
Williamson Rey
& Williamson Patented Aug. 6, 1929.

1,723,356

UNITED STATES PATENT OFFICE.

LOUIS T. KNOWLES, OF MINNEAPOLIS, MINNESOTA.

WORK HOLDER.

Application filed February 29, 1928. Serial No. 257,938.

This invention relates to a work holder for use on lathes, drill presses, vises etc., for finely centering work to be operated upon. Work secured to a face plate or similar holder, to be operated upon in a lathe, drill press, or the like, is now commonly clamped on the face of the plate and is roughly adjusted and centered by use of radially spaced concentric grooves formed in the face of the plate. Such an adjustment is sufficient for rough work. When it becomes necessary, however, to operate on work which has already been partially machined, and on certain other types of work, a more accurate and fine adjustment must be made of the work on the holder. Accuracy up to $\frac{1}{2}$nd of an inch can be made by an experienced mechanic by use of the concentric grooves. In the finest kind of operations, the work must be adjusted to 1/1000th of an inch accuracy. Accordingly after the work has been secured in place, as is above described, the work is tapped slightly by use of rubber hammers to center the same. It will sometimes take a skilled mechanic a considerable length of time to accurately center work on a face plate by this method, due to the fact that the taps of the rubber hammers cannot be accurately regulated, repeatedly carrying the work from one off center position to a second off center position.

It is the object of this invention to provide a novel and improved work holder, which can be used for quickly and easily adjusting work to accurately center the same with the nicest and finest accuracy.

To this end, the invention consists in the novel parts and combinations of parts hereinafter defined in the claims and described in the following specification made in connection with the accompanying drawings, wherein like reference characters refer to the same or similar parts throughout the various views, and, in which, Figure 1 is a front elevation of a work holder embodying the present invention, certain of the parts being broken away and shown in section;

Fig. 2 is a view in side elevation of the work holder, certain of the parts being broken away and shown in section;

Fig. 3 is a view in rear elevation of the work holder, certain of the parts being broken away and other parts being shown in section, and Fig. 4 is a section taken on the line 4—4 of Fig. 3, as is indicated by the arrows, and illustrating a clamp securing a piece of work illustrated in dotted lines to the face plate of the holder.

Referring to the drawings, the present invention is illustrated as being embodied in a chuck, including a chuck mount 5, a backing plate 6 and a face plate 7. The chuck mount 5 has the usual screw threaded opening therethrough, and is of standard type, and is releasably securable to the rear side of the backing plate 6, in the conventional manner, by studs 8 and nuts 9 so that the mount may be removed from the backing plate and another mount of different size substituted therefor. Preferably, both the backing plate 6 and the face plate 7 are circular in shape and are of the same diameter, the face plate 7 being of considerably greater thickness than the backing plate 6. The plate 7 on its face is provided with two diametrical grooves 10 set at right angles to each other, and the grooves are of such shape in cross section that suitable work holding clamps 11 may be mounted therein, to hold a piece of work such as the work A on the face plate. The face of the plate will also be provided with the usual radially spaced and concentric grooves 12 for determining the proper positioning of the work on the plate relative to the axial center thereof.

The rear side of the face plate 7 will abut the forward side of the backing plate 6, so that the face plate may be slid on the backing plate in a plane substantially parallel to the general plane of the backing plate, and at right angles to the axial centers of the chuck mount 5 and the two plates. Four substantially rectangular shaped recesses 13 are provided in the face plate 7. The recesses extend forwardly from the rear side of the face plate and project radially from the circumferential edge of the plate inwardly to approximately half the distance between the edge of the plate and the center thereof, terminating in straight shoulders 14 at their inner ends. The recesses will be disposed at right angles to each other, so that the shoulders 14 of opposite recesses will be diametrically opposed in respect to the center of the face plate. Shoulders 14, as illustrated, will be set at right angles to each other to form portions of the sides of a square having its center in the axial center of the face plate. It will be understood, however, that the shoulders 14 could be so arranged that they would form portions of the sides of a rectangle of any size. Four rectangular blocks 15 of narrower width than the width of the recesses 13 are formed integral with, or secured to, the forward side of the backing plate 6. These blocks are preferably spaced inwardly a short distance from the circumferential edge of the backing plate and are comparatively short in length relative to the length of the recesses 13. The blocks 15 are radially arranged respective to the axis of the backing plate and are set at right angles to each other, so that opposite blocks will be diametrically opposed to each other. Each block has a screw threaded opening therethrough within which a screw 16 is situated, and the axes of the four screws will be so arranged that they will be radial to the center of the backing plate and respectively set at right angles to one another. Each screw 16 has a broad, flat faced circular head 17 at its inner end and has a polygonal shaped key engaging portion 18 at its outer end. Small rectangular bearing blocks 19 are placed within the recesses 13 to abut the shoulders 14 and to extend between the sides of the recesses, and the heads 17 of the screws 16 bear against these bearing blocks.

A number of comparatively large openings 20 will be provided through the backing plate 6, and these openings will be preferably regularly arranged in respect to the circumference of the backing plate. As illustrated in the drawings, two openings 20 are provided between each pair of blocks 15. Secured in the rear side of the face plate 7 between adjacent recesses 13 therein, are studs 21 which extend rearwardly from the face plate through the openings 20 in the backing plate. The studs are of considerably smaller diameter than the diameter of the openings 20 and carry at the rear side of the facing plate, washers 22. These washers have openings therethrough slightly larger in diameter than the diameter of the studs for a purpose to be hereinafter described. Lock nuts 23 are threaded on the rear ends of the studs 21 and clamp against the washers 23. The washers are of such size as to fit completely over the rear ends of the openings 20, no matter what the position of the studs may be in respect to the centers of the openings 20. The lock nuts 23 have slots 24 cut through one side of the same at one of the corners thereof. Before the nuts are threaded on to the studs 23, they will be pounded slightly to reduce the spacing of the slots 23, whereupon as the nuts are threaded on to the studs, they will tightly fit thereon and can only be turned as the ends adjacent the openings 24 are sprung apart slightly. Thus, when the nuts are screwed down on the washers 22, they will hold their positions.

In assembling the device, a film of oil will be placed between the abutting surfaces of the facing and backing plates. Oil will also be supplied to the screws 16. The nuts 23 will be screwed down quite tightly on to washers 22. However, the nuts will not be screwed down so tightly that the washers cannot move in respect to the studs 21. As the openings through the washers 22 will be slightly larger in diameter than the diameter of the studs 21, the relative tension exerted against the washers by the various nuts can be tested by the ease with which the washers 22 will slide to and from the studs 21. By thus testing the various washers, the tension exerted by all the nuts can be made the same. The face plate 7 may, accordingly, slide with equal freedom on the backing plate 6 in any direction.

When it becomes desirable to fix and center a piece of work, such as the work A on the chuck, the work will be clamped in place in the grooves 10 on the face of the face plate as by the clamp 11, or similar means, and the work may be roughly adjusted relative to the axial center of the face plate in the usual manner by use of the grooves 12. Before the work is placed on the face plate, the screws 16 will have been operated to aline the circumferential edges of the face and backing plates and to tightly bear against all four bearing plates 19 to clamp the face plate in position on the backing plate. A fine adjustment of the work relative to the axial center of the backing plate may now be made. One of the screws 16 will be slightly loosened, whereupon the screw 16 opposite the loosened screw may be correspondingly tightened. This action will cause the whole face plate 7 to move along a diametrical line running through the axial center of the backing plate, and in a plane parallel to the general plane of the backing plate and at right angles to the axial center of the backing plate. The heads 17 of the two unmoved screws will continue to bear against their two bearing plates 19 during this moving action, so as to prevent movement of the face plate in any other than a line diametrical to the center of the backing plate. The oil film interposed between the abutting surfaces of the two plates will prevent a jerky movement, as the plates are slid, so that the finest adjustment can be made of the work relative to the axial center of the backing plate by the said movement of two of the screws. The studs 21, nuts 23 and washers 22 will move with the face plate, the tension of the nuts 24 on the washers 22 being such that movement of one plate relative to another will not be prevented and yet being sufficient to form an oil tight joint between the abutting sides of the plates, so that the film of oil provided cannot escape. In actual practice, one screw 18 will be loosened, while the other is tightened, so that at all times during the moving action the face plate will be positively held from any but the desired movement by the four screws. When the face plate has been moved, as specified in the one direction, the other two diametrically opposed screws which have hitherto remained untouched may be respectively tightened and loosened to move the face plate in a line diametrically across the backing plate at direct right angles to the first line of movement. It will thus be seen that the work carried on the face plate may be adjusted by the four screws, to move the work along the lines of a right angle to any desired position relative to the axial center of the backing plate. As all four of the screws bear directly against the bearing plates 19 and as the face plate may be moved without any jerky movement whatsoever, due to the oil film which may be provided between the abutting sides of the two plates, it will be seen that the finest adjustment and centering of the work A may be occasioned. The inventor has used the work holder in actual practice and has found that he can adjust work to 1/1000th of an inch accuracy, relative to the axial center of the backing plate within a few minutes.

Due to the fact that the heads 17 of the screws 16 are quite large, and also to the fact that the shoulders 14 are provided approximately midway between the center of the face plate and the circumferential edge thereof, no binding action will take place between the heads of diametrically opposed screws and their bearing blocks 19, as the other screws are moved. Also, due to the fact that the shoulders 14 are spaced approximately midway between the center of the face plate and circumferential edge thereof, a long lever arm will be provided between the center of the backing plate and the shoulders 14 so that the screws will securely hold the facing plate in position, when the whole work holder is turned rapidly as on a lathe.

It will be understood that the screws 16 will be used for only fine adjustment of the work and, accordingly, there will be sufficient clearance between the sides of the openings 20 through the backing plate and the studs 21 to secure the fine adjustment. Also, the fine adjustment obtained by use of the screws will be insufficient to throw the facing plate 7 off center from the backing plate sufficiently to interfere with the turning action of the chuck, as it is used on a lathe or similar rotating machine.

The blocks 15 and the recesses 13 may, of course, be reversed on the facing and backing plates without changing the operation of the device. Other means besides the grooves 10 and grooves 12 may be provided on the face of the facing plate 7 for holding and positioning work clamped on the face of the face plate 7. It will be understood that various other changes may be made in the form, details, arrangement and proportions of the various parts without departing from the scope of the present invention.

What is claimed is:

1. A fine centering work holder comprising, a backing plate, a face plate slidably mounted on said backing plate, means on the face of said face plate for permitting work to be secured thereto and to be roughly centered thereon, four screws mounted on said backing plate disposed radially in respect to the axial center of said backing plate and set at 90° angles to each other, and four bearing portions on said face plate against each of which one of said screws is adapted to bear, said bearing portions forming portions of the sides of a rectangle, whereby said face plate can be moved along two lines extending diametrically at right angles through the axial center of said backing plate, by adjustment of said screws, and said face plate may be positively held by said screws during and after such movement to finely adjust work carried on said face plate relative to the axial center of said backing plate.

2. A fine centering work holder comprising, a backing plate, a face plate mounted on said backing plate for sliding movement in respect thereto, means on the face of said face plate permitting work to be secured thereto and to be roughly adjusted thereon, comparatively narrow blocks mounted on said backing plate and projecting into comparatively wide recesses formed in said face plate, said recesses being radially arranged in said face plate and having inner bearing ends forming portions of the sides of a true rectangle, screws mounted in said blocks and each having an inner end bearing against one of the bearing portions of said recesses, said screws being radial to the axial center of said backing plate and being set at right angles to each other, whereby by adjustment of said screws, said face plate may be slid in a plane parallel to said face plate to a desired position to finely adjust work carried on the face plate relative to the axial center of said backing plate, and during and after such adjustment said face plate may be positively held in position by means of said screws.

3. A fine centering work holder comprising, a backing plate having a series of large openings projecting therethrough, a face plate having its rear side bearing against said backing plate and slidable thereon, studs secured to said face plate and projecting rearwardly through said large openings but being of less diameter than the diameter of said openings to permit movement of said face plate relative to said backing plate, washers surrounding said studs at the rear of said backing plate, lock nuts threaded onto said studs and bearing against the rear sides of said washers, said nuts being so adjusted as to hold said face plate and said backing plate together to form an oil tight joint between the opposing surfaces thereof, but yet permitting limited sliding movement of said face plate relative to said backing plate, means on the face of said face plate for permitting work to be secured thereto and to be roughly centered thereon, and means for positively holding and sliding said face plate on said backing plate in any desired direction in a plane parallel to said backing plate to finely adjust work carried on said face plate relative to the axial center of said backing plate.

4. The structure defined in claim 3, the openings through said washers being of slightly greater diameter than the diameter of said studs to permit slight movement of said washers relative to said studs to determine the relative tension between said nuts and said backing plate.

5. A fine centering work holder comprising, a backing plate, a face plate mounted on said backing plate and having four recesses formed on the rear side thereof set at right angles to each other and radially disposed in respect to the center of said face plate, said face plate having bearing shoulders at the inner ends of said recesses set at right angles to each other, four blocks mounted on the forward side of said backing plate, radially disposed in respect to the center of said backing plate, set at right angles to each other and being of narrower width than the width of said recesses and fitting into said recesses, diametrically opposed screws mounted for movement in opposite blocks and having heads bearing against said shoulders in said face plate, and means for securing said face plate to said backing plate to permit a limited sliding movement of said face plate respective to the said backing plate and in a plane parallel to the plane of said backing plate, whereby work carried by said face plate can be finely adjusted relative to the center of said backing plate and said face plate can be positively held during and after the adjustment thereof.

6. The structure defined in claim 5, the shoulders on said face plate being approximately intermediately spaced between the center of said plate and the edge thereof.

7. The structure defined in claim 5, and bearing plates disposed between the heads of said screws and the shoulders on said face plate.

8. The structure defined in claim 5, the heads of said screws having large bearing surfaces disposed at right angles to radii projecting from the center of said face plate through the axial centers of said screws.

9. A fine centering work holder comprising, a backing plate, a face plate mounted on said backing plate for sliding movement thereon, means for permitting the work to be secured on the face of said face plate and to be roughly centered thereon, means for positively holding and at the same time sliding said face plate to an exact, desired, adjusted position on said backing plate by movement along two straight lines running diametrically through said backing plate and set at right angles to each other, and means preventing the movement of said face plate in all directions except along said two lines.

10. A work holder comprising a pair of plates slidably mounted on each other, four screws mounted on one of said plates and disposed radially in respect to the axial center of said plate and set at 90° angles to each other, four plane surfaced bearing portions on the other of said plates against each of which one of said screws is adapted to bear, said bearing portions forming sides of a rectangle, whereby one of said plates can be moved on the other plate along two lines extending diametrically at right angles to each other through the center of the other plate by adjustment of said screws, and said movable plate can be positively held by said screws during and after such movement to finely adjust work carried on one of said plates relative to the axial center of the other plate.

In testimony whereof I affix my signature.

LOUIS T. KNOWLES.